US012698187B2

(12) United States Patent
Holford et al.

(10) Patent No.: US 12,698,187 B2
(45) Date of Patent: Aug. 4, 2026

(54) APPARATUS AND METHOD FOR LIFTING A PULLEY

(71) Applicant: TuffStuff International Pty Ltd, Tomago NSW (AU)

(72) Inventors: Graham Holford, Tomago NSW (AU); Jamie Whybrow, Tomago NSW (AU); Matthew Croker, Tomago NSW (AU)

(73) Assignee: TUFFSTUFF INTERNATIONAL PTY LTD, Tomago NSW (AU)

( * ) Notice: Subject to any disclaimer, the term of this patent is extended or adjusted under 35 U.S.C. 154(b) by 1063 days.

(21) Appl. No.: 17/859,224

(22) Filed: Jul. 7, 2022

(65) Prior Publication Data

US 2024/0010473 A1 Jan. 11, 2024

(51) Int. Cl.
*B66C 1/42* (2006.01)

(52) U.S. Cl.
CPC .................................... *B66C 1/42* (2013.01)

(58) Field of Classification Search
CPC .. B66C 1/12; B66C 1/66; B66C 1/122; B66C 1/42; B66C 1/24
USPC ............................ 294/67.1, 81.1, 81.3, 81.5
See application file for complete search history.

(56) References Cited

U.S. PATENT DOCUMENTS

| | | | | |
|---|---|---|---|---|
| 3,021,166 A * | 2/1962 | Kempel | B66C 1/20 | 294/81.5 |
| 6,079,760 A * | 6/2000 | Khachaturian | B66C 1/12 | 294/81.1 |
| 7,222,903 B2 * | 5/2007 | Tardiff | B66C 1/10 | 294/74 |
| 8,955,894 B2 * | 2/2015 | Parker | B66C 1/16 | 294/81.1 |
| 10,053,338 B1 * | 8/2018 | Khachaturian | B66C 1/66 | |
| 10,633,223 B1 * | 4/2020 | Cain | B66C 1/12 | |
| 11,708,246 B2 * | 7/2023 | Myers | B66C 1/10 | 294/81.1 |

* cited by examiner

*Primary Examiner* — Stephen A Vu
(74) *Attorney, Agent, or Firm* — RANKIN, HILL & CLARK LLP

(57) ABSTRACT

A lifting apparatus (10) for a pulley (12), the apparatus (10) including: a first beam section (14) adapted to couple to the pulley (12) in a fitted condition; and a second beam section (16) connected to the first beam section (14) in a spaced apart relationship extending parallel to the first beam section (14). The second beam section (16) includes a lifting arrangement (20) including a pair of lift couplings (22) and a plurality of notches (24), the pair of lift couplings (22) being moveable between a first condition in which each one of the pair of lift couplings (22) are able to be moved between the plurality of notches (24), and a second condition in which each one of the pair of lift couplings (22) is substantially retained in a respective one of the plurality of notches (24). A related method of use is also disclosed.

20 Claims, 12 Drawing Sheets

APPARATUS AND METHOD FOR LIFTING A PULLEY

TECHNICAL FIELD

The invention relates to an apparatus and a method for lifting a pulley such as a conveyor belt pulley.

BACKGROUND

Pulleys such as those used to support and direct conveyor belts in industrial or mining applications may need to be removed to allow for maintenance or replacement. Such pulleys typically have a cylindrical or barrel shaped body with shafts at opposing ends thereof. Such pulleys may be relatively heavy, and lifting means such as a crane or the like is required to lift the pulley. However, the shape of the pulley and access to the pulley due to the belt may make pulley lifting and removal challenging.

Accordingly, various types of pulley lifting devices have been developed. One such device has a U-shaped body with a first beam section that is fitted along and adjacent an outer surface of the pulley and a second beam section with fixed lifting points that is spaced apart from the first beam section to define a gap. In use, the conveyor belt may be raised and fitted into the gap and first beam section may be attached to the pulley. Chains of a crane may then be connected to the fixed lifting points of the second beam section and the pulley may be lifted upwardly and outwardly about the conveyor.

A problem with such pulley lifting devices relates to the coupling between the pulley and the device, and the balancing of the lifting device during lifting such as in situations where the device may need to be adapted for use for different lengths and sizes of pulleys as well as different installation situations.

The invention disclosed herein seeks to overcome one or more of the above identified problems or at least provide a useful alternative.

SUMMARY

In accordance with a first broad aspect there is provided, a lifting apparatus for a pulley. The apparatus may include a first beam section adapted to couple to the pulley in a fitted condition; and a second beam section connected to the first beam section in a spaced apart relationship extending parallel to the first beam section and defining a gap between the first beam section and the second beam section. The second beam section may include a lifting arrangement including a pair of lift couplings and a plurality of notches, the pair of lift couplings being moveable between a first condition in which each one of the pair of lift couplings are able to be moved between the plurality of notches, and a second condition in which each one of the pair of lift couplings is substantially retained in a respective one of the plurality of notches.

In an aspect, the pair of lift couplings are adapted to be rotatable between the first condition and the second condition.

In another aspect, the second beam section includes at least one track arranged adjacent to the plurality of notches and extending in lengthwise direction relative to the second beam section, wherein the pair of lift couplings are slidable along the track in the first condition.

In yet another aspect, each one of the lift couplings includes a first end adapted to couple with one of the plurality of notches and a second end adapted to couple with a lifting tether.

In yet another aspect, the first end includes a cam, the cam being arranged to substantially lock the lift couplings in the second condition during lifting by the lifting tether.

In yet another aspect, the cam is shaped to create an interference fit between the track and respective one of the plurality of notches in the second condition.

In yet another aspect, in the second condition, each of the pair of lift couplings are angled toward one another.

In yet another aspect, the cam is shaped to enable the lifting couplings to be unlocked by rotation of each one of the pair of lift couplings in a direction away from one another so as to be moveable in the first condition.

In yet another aspect, each one of the lift couplings includes a pin at its respective first and second ends.

In yet another aspect, each one of the lift couplings is elongate and independently moveable relative to the other of the lift couplings.

In yet another aspect, the first beam section is adjustable in length.

In yet another aspect, the length of the first beam section is fixable in the fitted condition.

In yet another aspect, the first beam section is telescopically adjustable.

In yet another aspect, the first beam section includes a first telescopic adjustment arrangement and a second telescopic adjustment arrangement.

In yet another aspect, the first telescopic adjustment arrangement includes stepwise adjustment, and the second telescopic adjustment arrangement includes continuous adjustment.

In yet another aspect, the first telescopic adjustment arrangement includes a pin and an aperture arrangement, and the second telescopic adjustment arrangement includes a threaded member to apply a clamping force to the pulley in the fitted condition.

In yet another aspect, first and second ends of the first beam section include projections adapted to capture the pulley therebetween.

In accordance with a second main aspect there is provided, a method for lifting a pulley using a lifting apparatus. The method may include one or more of the steps of: coupling a first beam section of the lifting apparatus to the pulley; sliding, in an unlocked condition, one or both of a pair of couplings along a track of a second beam section of the lifting apparatus and aligning the one or both of the pair of couplings with respective selected notches located adjacent the track; rotating each of the pair of couplings to a locked condition, in which each of the pair of couplings becomes substantially locked with its respective selected one of the notches; connecting a tether to each of the pair of couplings such that the lifting apparatus and coupled pulley are liftable.

In an aspect, the method may include rotating each of the pair of couplings to the locked condition includes rotating a cam associated with each of the pair of couplings to provide an interference fit between the track and respective one of the selected notches.

In another aspect, the coupling of the first beam section to the pulley includes telescopically adjusting the length of the first beam section.

BRIEF DESCRIPTION OF THE FIGURES

The invention is described, by way of non-limiting example only, by reference to the accompanying figures, in which.

DETAILED DESCRIPTION

Figure 1:
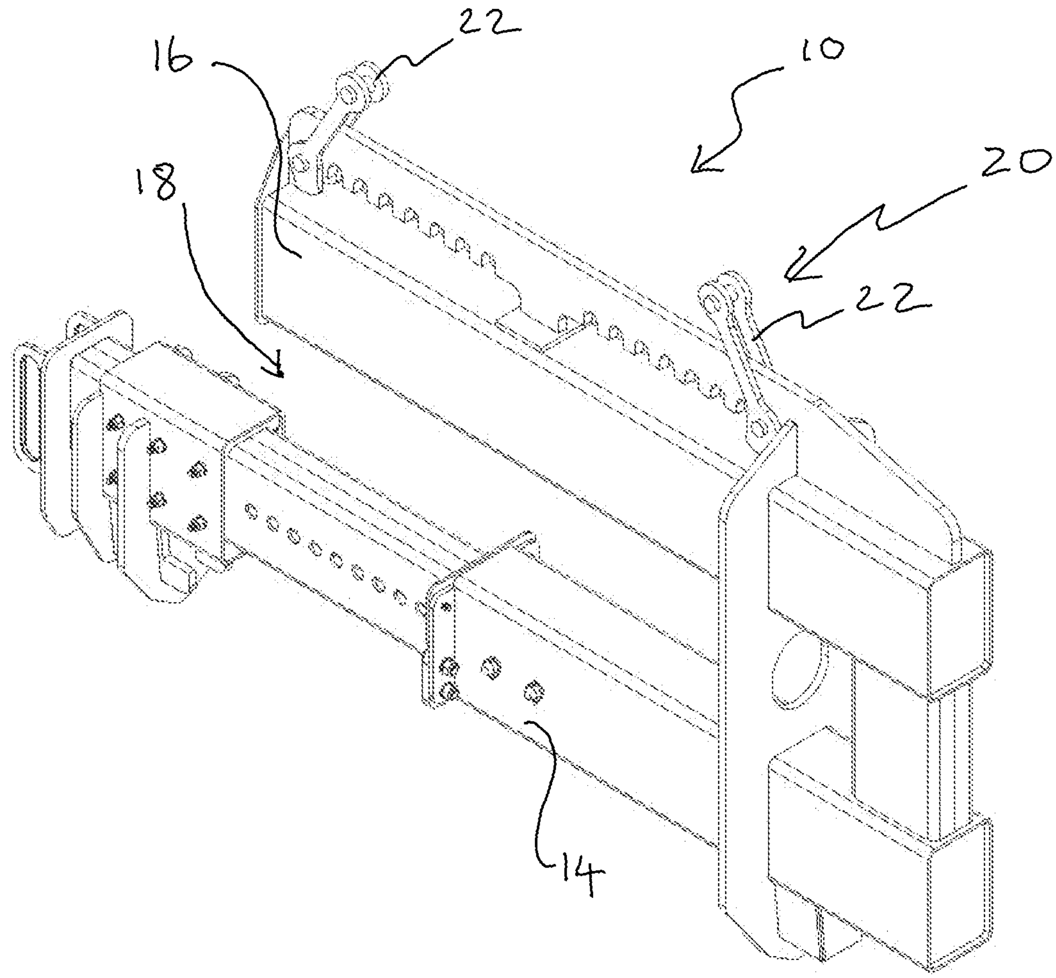
FIG. 1 is a right-hand side perspective view illustrating a lifting apparatus for a pulley.
Figure 2:
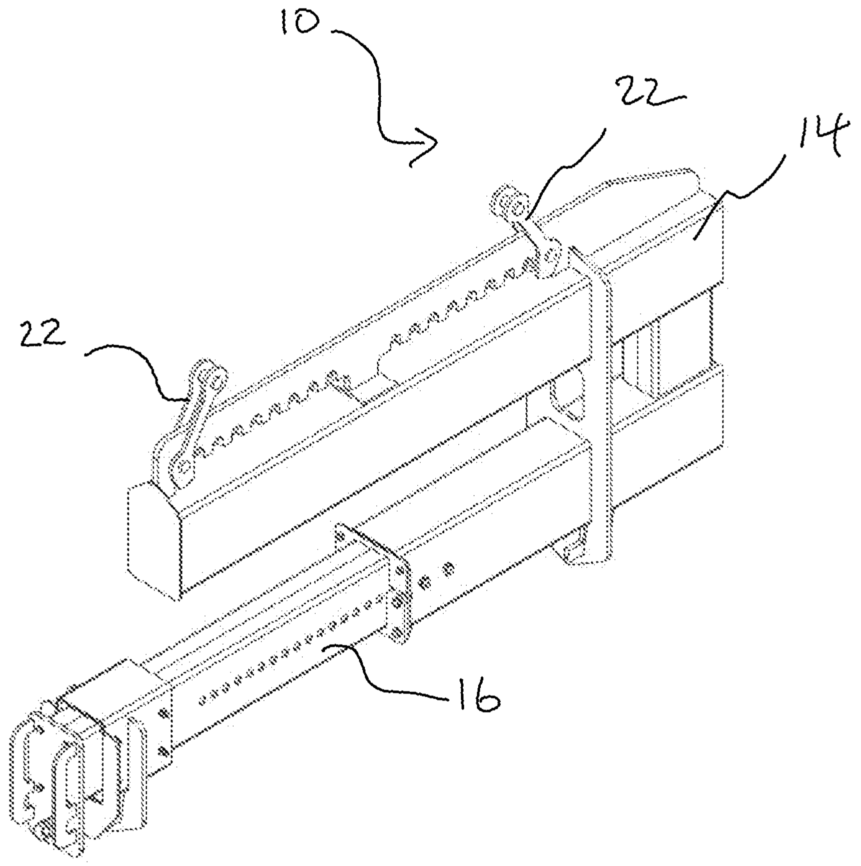
FIG. 2 is a left-hand side perspective view illustrating the lifting apparatus.

Referring initially to FIGS. 1 to 6, there is shown a lifting apparatus 10 for a pulley 12 (shown in FIG. 9*b*) or the like i.e. a roller. The apparatus 10 includes a first beam section 14 adapted to couple to the pulley 12 in a fitted condition, and a second beam section 16 connected to the first beam section 14 section in a spaced apart relationship extending parallel to the first beam section 14 and defining a gap 18 between the first beam section 14 and the second beam section 16. The gap 18 may allow receipt and clearance for a conveyor belt 17 (shown in FIG. 9*b*) that may be lifted off the pulley 12 to allow the first beam section 14 to couple to and fit directly adjacent the pulley 12.

Figure 6:
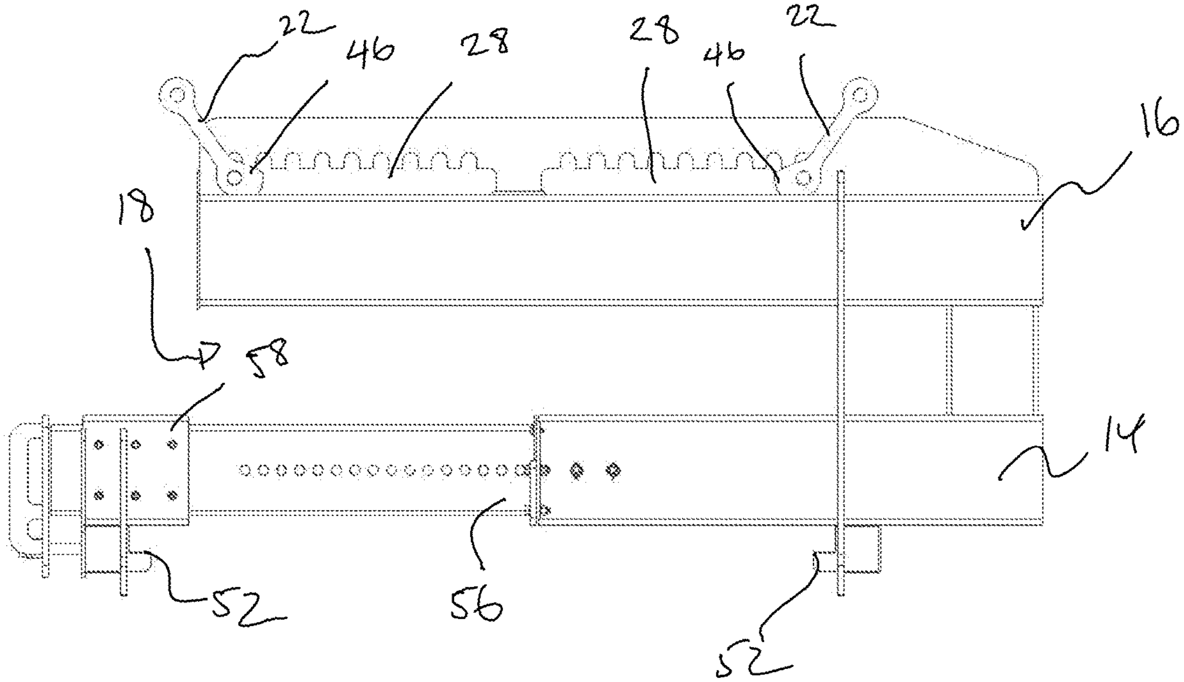
FIG. 6 is a side view illustrating lift couplings of the apparatus in an unlocked condition.
Figure 7:
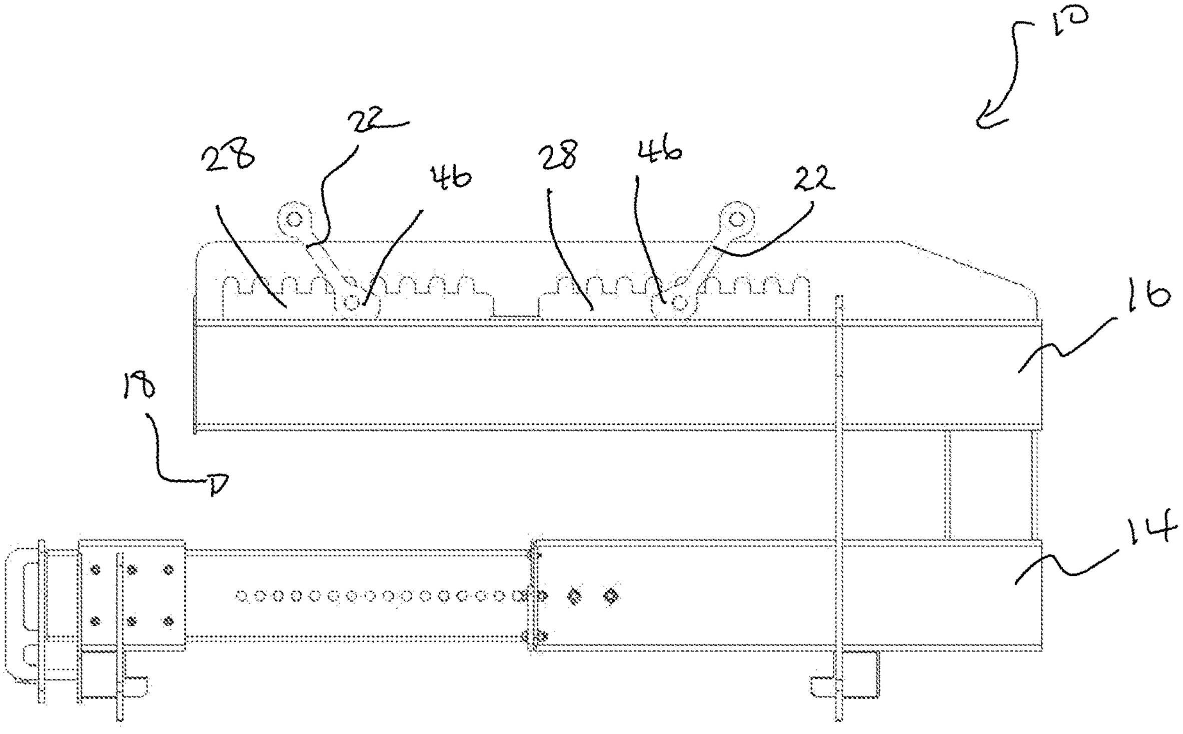
FIG. 7 is a side view illustrating lift couplings of the apparatus in the unlocked condition, with the lift couplings moved inwardly relative to FIG. 7.
Figure 8:
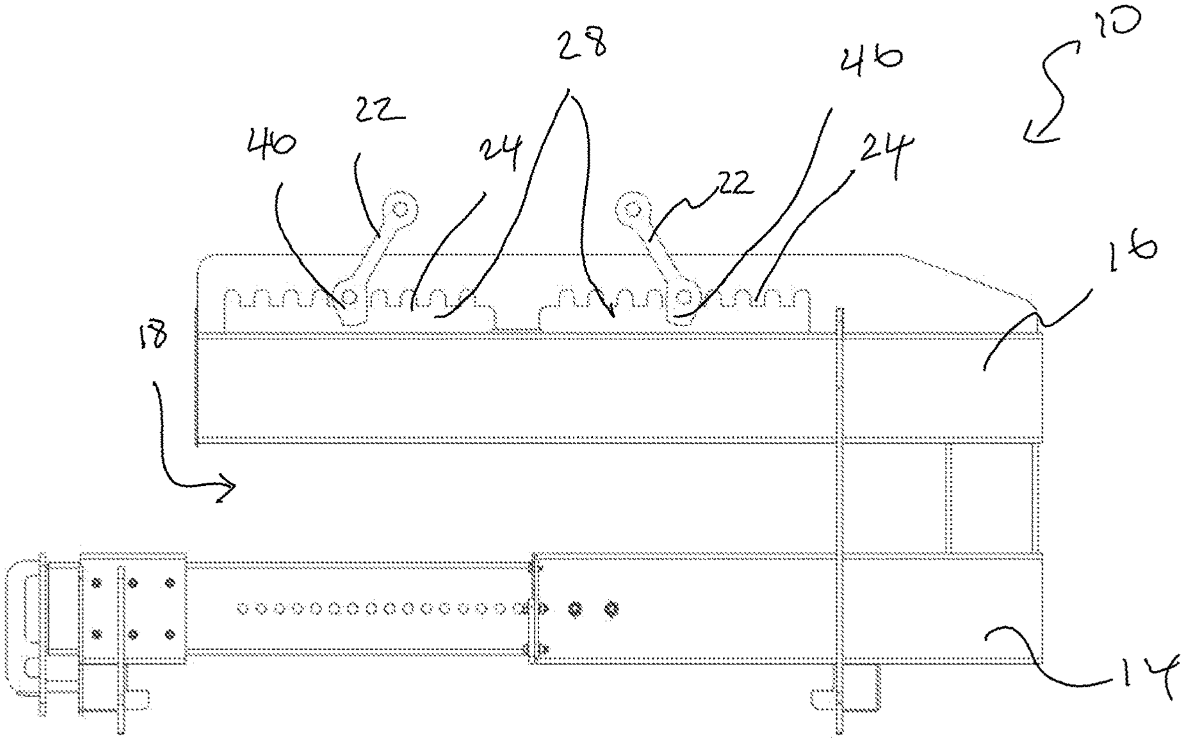
FIG. 8 is a side view illustrating the lift couplings of the apparatus in a locked condition.

The second beam 16 section includes a lifting arrangement 20 including a pair of lift couplings 22 and a plurality of locators or notches 24. The pair of lift couplings 22 are moveable, more specifically slidable, between a first condition (an example of which is shown in FIGS. 6 and 7) each one of the pair of lift couplings 22 are able to be moved or slid between the plurality of notches, and a second condition (an example of which is shown in FIG. 8) in which each one of the pair of lift couplings 22 is substantially retained or locked in a respective one of the plurality of notches 24. The movement of the lift couplings 22 enables balancing of the lifting load.

Figure 3:
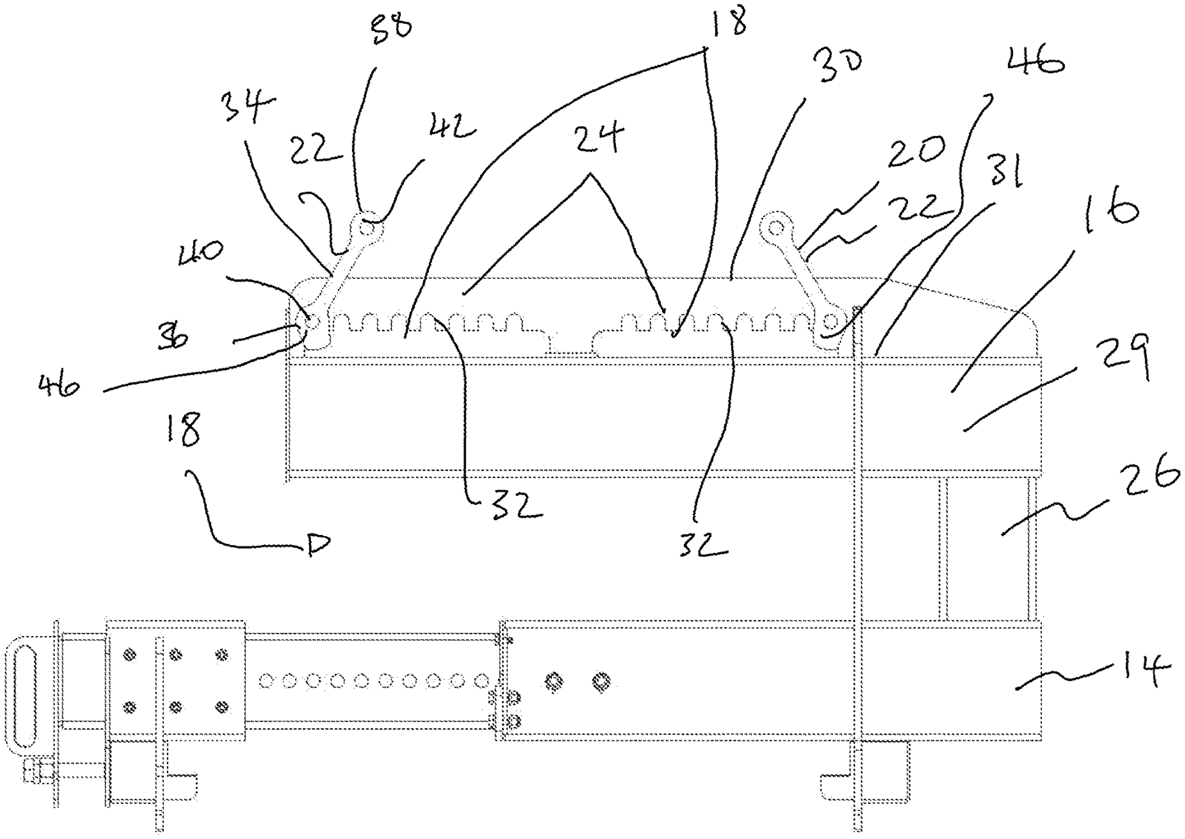
FIG. 3 is a left-hand side view illustrating the lifting apparatus.

In more detail, referring to FIG. 3, the first and second beam sections 14, 16 are spaced apart by an intermediate side section 26 which sets the distance of the gap 18, the arrangement having a generally sideways U-shape. The second beam section 16 is elongate and includes a track or guide 28 extending lengthwise there along and adjacent the plurality of notches 24. The track 28 is arranged to allow each of the pair of lift couplings to be movable and slide there along in the unlocked condition when being repositioned to different ones of the plurality of notches 24.

In this example, the second beam section 16 includes a main second beam 29 and a plate 30 extending along an ordinary top 31 thereof. The plate 30 includes two notched sections 32 which are spaced apart from the top 31 to define the track 28. The notched section 32 and track 28 are divided to separate each of the pair of lift couplings 22.

The pair of lift couplings 22 each include a pair elongate bodes 34 having first and second ends 36, 38. Each of the pair of elongate bodies 34 are coupled by respective first and second pins 40, 42. The first end 36 and the pin 40 are adapted to couple with the notches 24 and the second end 38 and pin 42 are adapted to connect with a lifting tether 44, shown in FIG. 10*c*. It is noted the plate 30 is received by the pair of elongate bodies 34 which serves to guide the movement of the pair of lift couplings 22 only in vertical plane such as in and an out of the notches 24 and in a lengthwise direction along track 28. The notches 24 are generally vertically oriented.

The first end 36 is shaped to provide a cam 46, the cam 46 being arranged to substantially lock or inhibit movement of the lift couplings 22 in the second condition during lifting by the lifting tether 44. In more detail, the cam 46 is longer in a lengthwise axis than its width, and the lengthwise axis of the cam 46 is angled relative to the lengthwise axis of the elongate bod 34. The angle between the lengthwise axis of the cam 46 and the lengthwise axis of the elongate body 34 may be an obtuse angle.

As such, when the elongate bodies 34 of the lift couples 22 are angled inward toward one another (as shown in FIG. 3)—the long axis of the cam 46 creates an interference fit between the track 28 and respective one of the plurality of notches 24. The long axis of the cam 46 may be aligned vertically in the second condition and aligned with the long axis of the notch 24. Accordingly, the lift couplings 22 are inhibited from dropping down out of the selected notches 24 which lock or retain the lift couplings 22 in place. It is noted that the lifting force of the lifting tether 44 serves to keep the cams 46 rotated toward the locked condition.

To disengage the lift couplings 22, each of the lift couplings 22 are outwardly rotated away from one another (as shown in FIGS. 6 and 7)—which rotates the respective cams 46 such that the long axis of the cam 46 is more aligned with a long axis of the track 28 and the short axis of the cam 46 is dimensioned to allow the lift couplings 22 to be moved out of the notches 24 and slide along the track 28 for repositioning. It is noted that in the disengaged or unlocked condition, the angled shape of the lift couplings 22, namely the angle between the cam 46 and the elongate body 34—means that the elongate bodies 34 of the lift couplings 22 are pointing away from one another. This assists to ensure the that lift couplings 22 do not become unintentionally disengaged during use when connected to the lifting tether 44.

Figure 4:
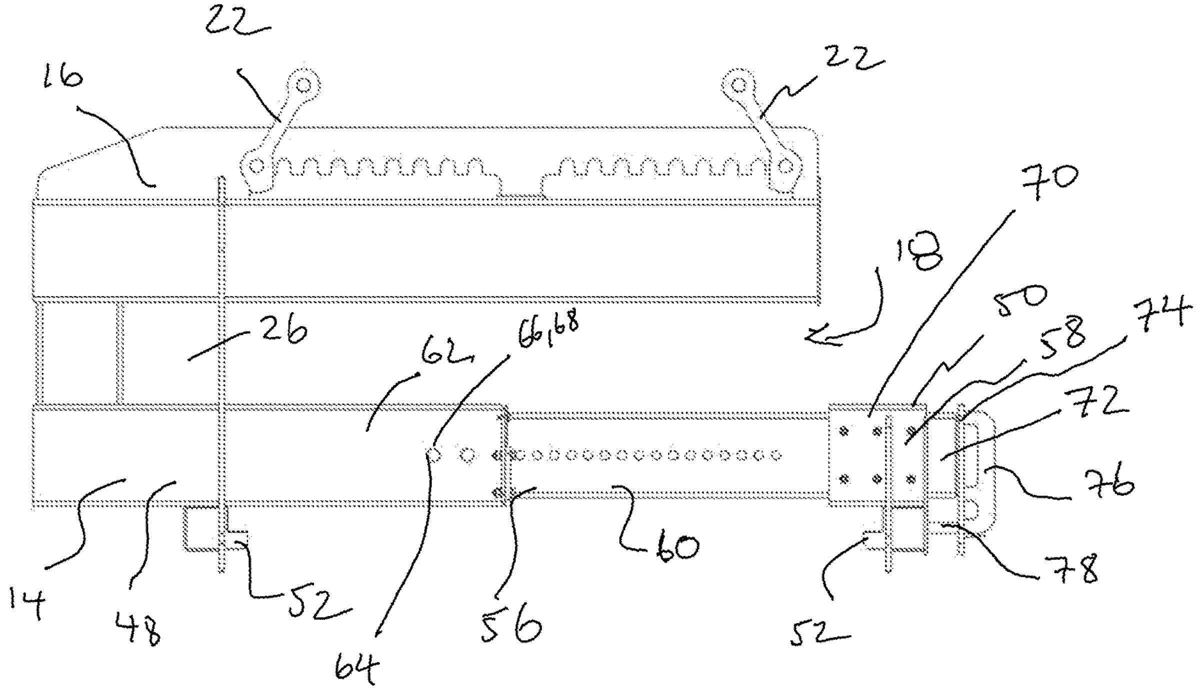
FIG. 4 is a right-hand side view illustrating the lifting apparatus.
Figure 5:
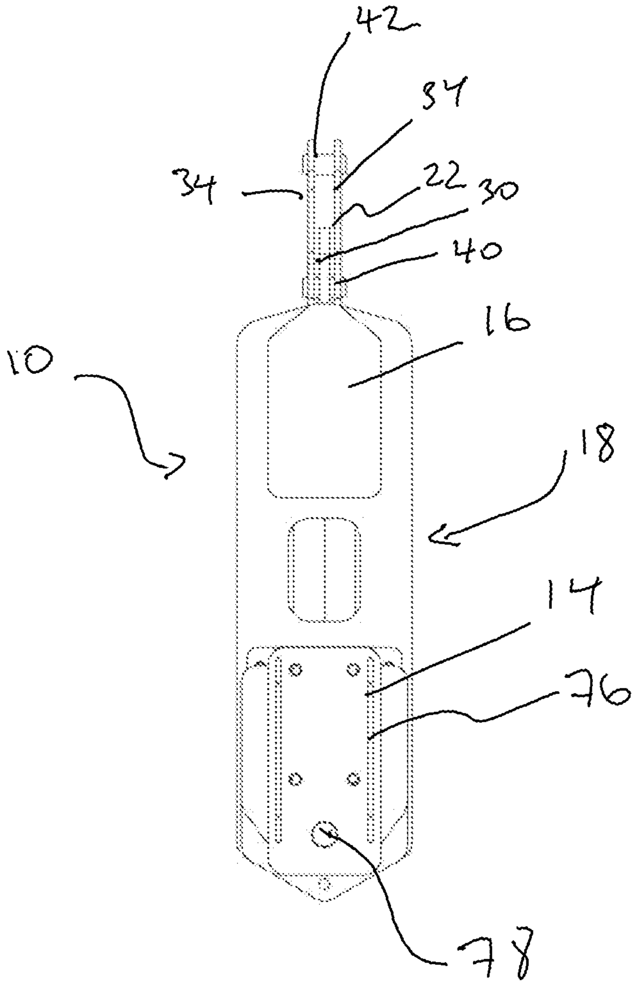
FIG. 5 is an end view illustrating the lifting apparatus.

Turning to the first beam section 14 in more detail and referring to FIGS. 4 and 5, the first beam section 14 is adjustable in length to so to fit with pulleys 12 of different sizes, namely lengths. The first beam section 14 is generally telescopic and has first and second ends 48, 50 that each include a projection or hook 52 that is arranged to be clamped or otherwise secured under a lip 54 (shown in FIG. 9*d*) of the pulley 12 in the fitted condition to allow lifting of the pulley 12.

In this example, the first beam section 14 includes a first telescopic adjustment arrangement 56 and a second telescopic adjustment arrangement 58. The first telescopic adjustment arrangement 56 includes stepwise adjustment provided by a first telescopic member 60 received by a second telescopic member 62 that are telescopically moveable relative to one another. The second telescopic member 62 is fixed to the intermediate side section 26. The first telescopic member 60 and the second telescopic member 62 are fixed or locked by a pin 64 that passes through locking apertures 66, 68 of the members 60, 62 respectively. This provided a first stage of locking.

The second telescopic adjustment arrangement 58 includes continuous adjustment provided by a third slidable member 70 that is carried by the first telescopic member 60 toward its free end 72. The free end 72 may include a plate structure 74 and handle 76 and support threaded actuators, in this example bolts 78, which are threadedly engaged with the third slidable member 70 such that actuation of the bolts 78 moves the third slidable member 70 along the first telescopic member 60.

In this example, the third slidable member 70 carries the projection or hook 52 and this allows the bolts 78 to be used to provide the finer adjustment to ensure the pulley 12 is appropriately captured, and provided a second stage of locking. Accordingly, it may be appreciated that the first telescopic adjustment arrangement 56 may be used to obtain the approximate fitment and first stage of locking, and the second telescopic adjustment arrangement 58 may be used for the finer adjustment, final clamping and second stage of locking to the pulley 12.

Figure 9A:
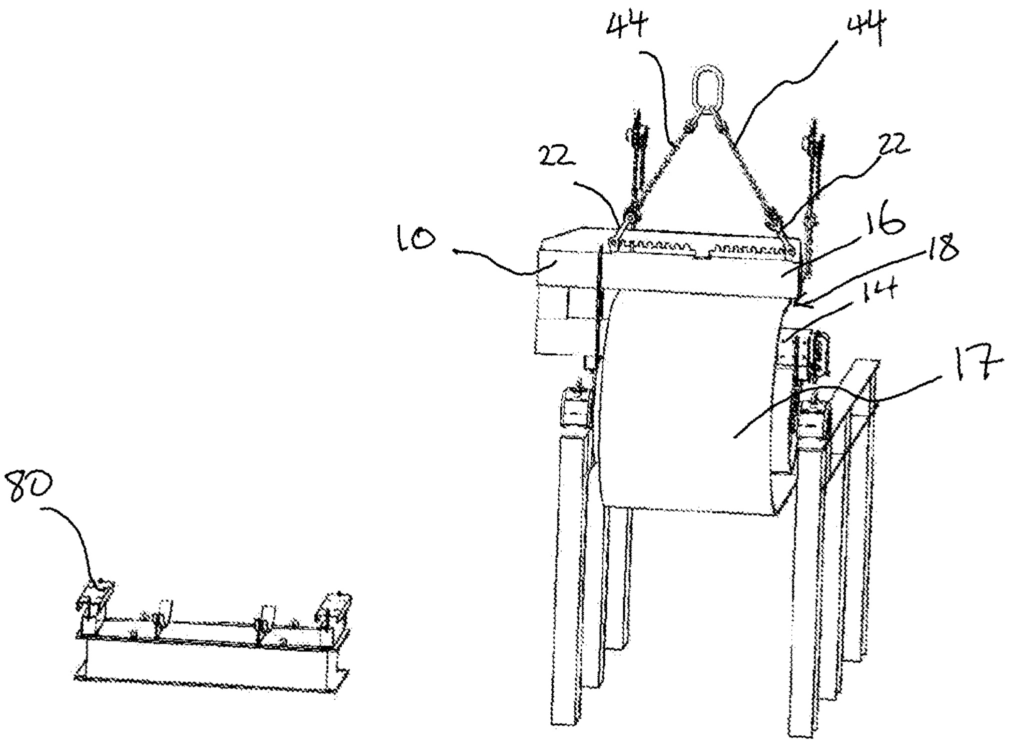
FIG. 9*a* is a perspective in use view illustrating the apparatus in a pre-fitted condition being moved to coupled with a pulley.
Figure 9B:
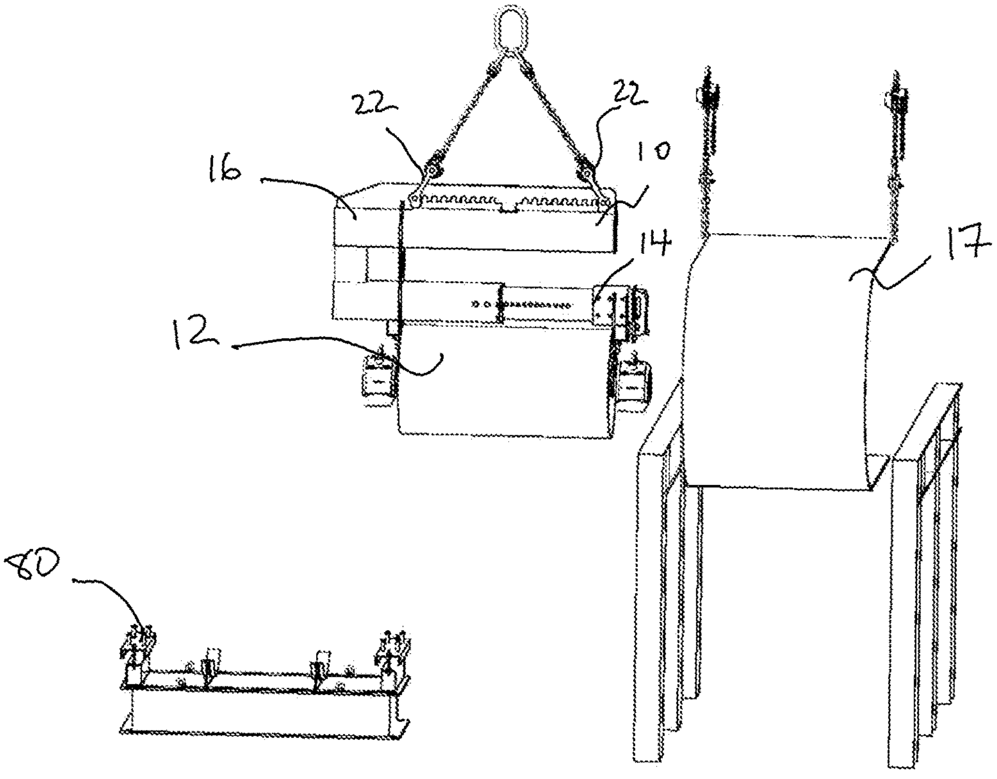
FIG. 9*b* is a perspective in use view illustrating the apparatus in fitted condition lifting the pulley.
Figure 9C:
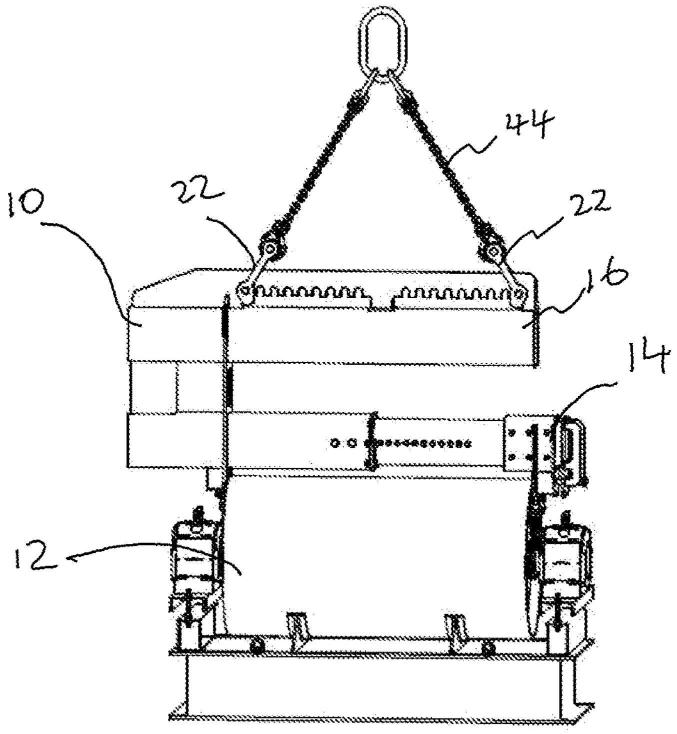
FIG. 9*c* is a perspective in use view illustrating the apparatus in fitted condition with the pulley moved to a cradle.
Figure 9D:
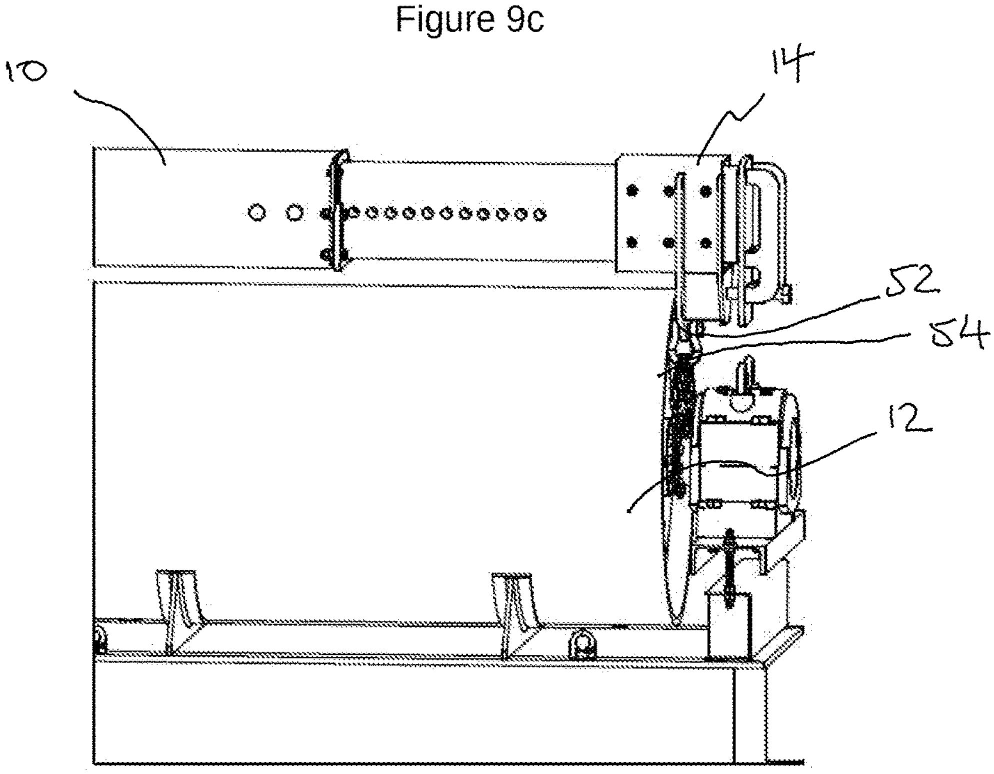
FIG. 9*d* is a detailed perspective in use view illustrating the apparatus in fitted condition with the pulley seated on the cradle.

Referring now to FIGS. 9*a* to 9*h*, in use, a method for lifting the pulley 12 using the lifting apparatus 10 may generally include the steps of: lifting the apparatus 10 for engagement with the pulley 12 with the lift couplings 12 fitted to initial positions in notches 24 to balance the unloaded lifting apparatus 10. The lifting may be provided by a crane, hoist or similar with lifting tethers 44 connected to each of the lift couplings 22 as shown in FIG. 10*a*. If a conveyor belt 17 is present, the apparatus 10 is fitted from the side or laterally with the belt 17 received by the gap 18 as shown in FIG. 9*a*. The belt 17 may be lifted to allow access as is best shown in FIG. 9*b*.

The first beam section 14 is then coupled to the pulley 12 by engaging the protections or hooks 52 with the pulley 12. The length of the first beam section 14 is telescopically adjusted, as need be, using the first telescopic adjustment arrangement 56 to obtain the approximate fitment, and the second telescopic adjustment arrangement 58 for the finer adjustment and final clamping to the pulley 12. It is noted that the clamping force of the first beam section 14 may retain the apparatus 10 atop the pulley 12 to allow the lift couplings 22 to be disengaged and repositioned, as need be. An example of the telescopic adjustment is shown in FIG. 9*g*.

Figure 9E:
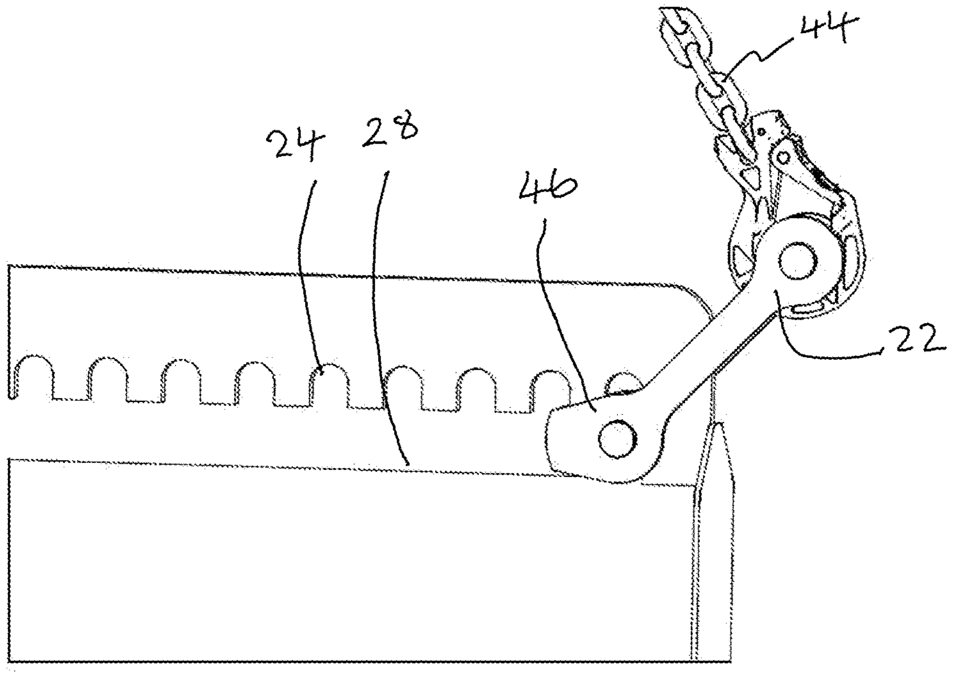
FIG. 9*e* is a detailed perspective in use view illustrating a coupling of the apparatus in an unlocked condition.
Figure 9F:
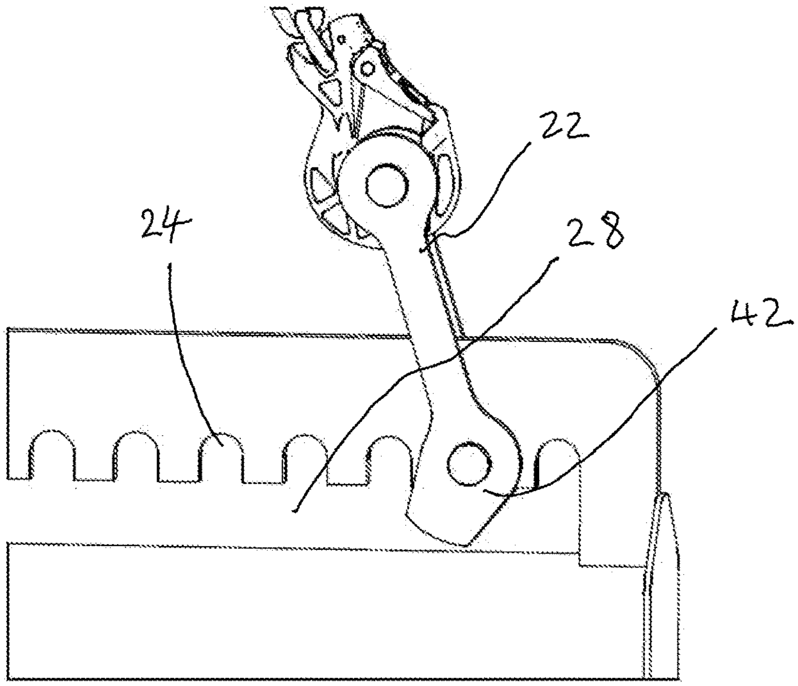
FIG. 9*f* is a detailed perspective in use view illustrating a coupling of the apparatus being moved toward the locked condition.

If the load is required to be balanced, the lifting tethers 44 may be relaxed or released, the lift couplings 22 may be then rotated away from one another to disengage the respective cams 46 and place the lift couplings 22 in the unlocked condition (an example of this is shown in FIGS. 9*e* and 9*f*. One or both of the pair of lift couplings 22 may then be slid along the track 28 of the second beam 16 section of the lifting apparatus 10 and aligned with selected ones of the notches 24 that provide balancing of the lifting load of the pulley 12.

Once in position, the lift couplings 22 may be then rotated toward one another to engage the respective cams 46 which forces and retains the lift couplings 22 in the respective selected notches. The lift couplings 22 are now back onto the locked or retained condition. The lifting tether 44 may then be reconnected or tightened such that the lifting apparatus 10 and coupled pulley 12 are liftable, as shown in FIG. 9*b*. It is noted that during this method, the lift couplings 22 remain connected to the apparatus 10 at all times and the tethers 44 may also remain connected.

Figure 9G:
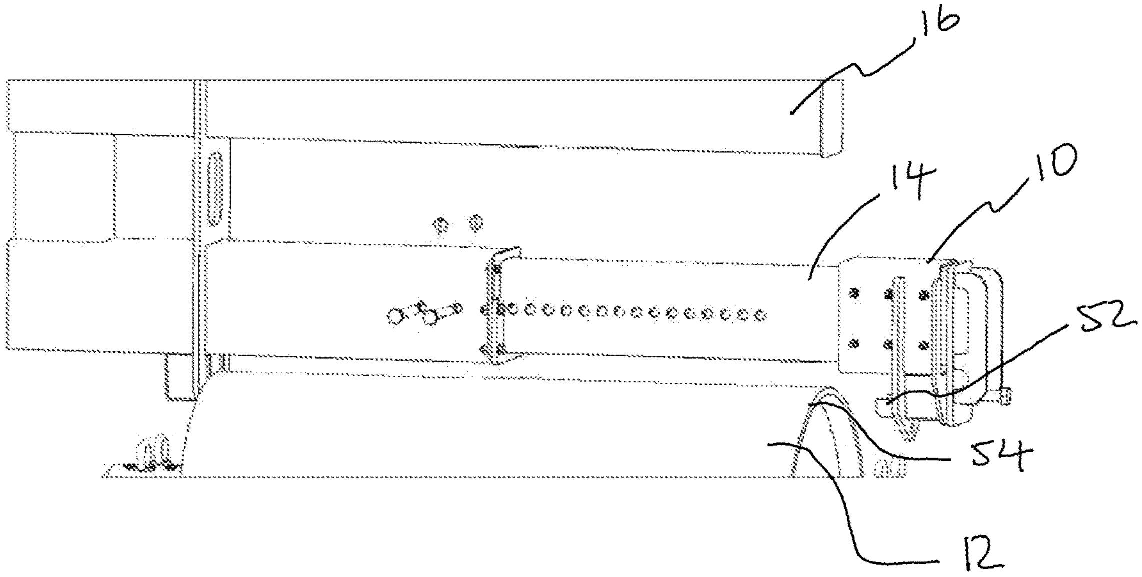
FIG. 9*g* is a detailed perspective in use view illustrating the apparatus being decoupled from the pulley.
Figure 9H:
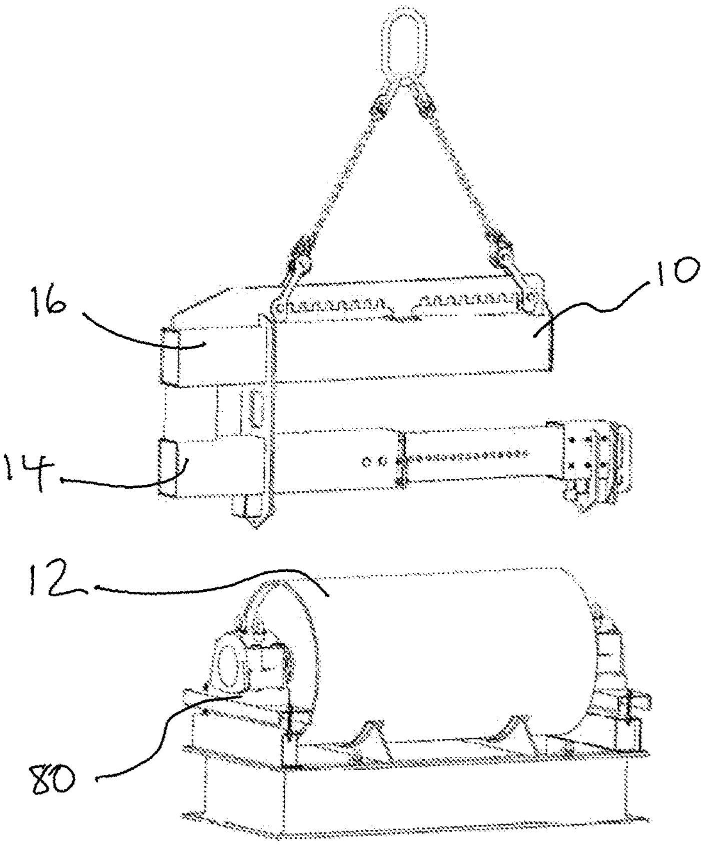
FIG. 9*h* is a detailed perspective in use view illustrating the apparatus being lifted away from the pulley.

The pulley 12 may be placed into a cradle 80 as shown in FIGS. 9*g* and 9*h* for maintenance and the lifting device 10 may be decoupled to a decoupled condition using the first and second telescopic adjustments arrangements 56, 58 and the lifting apparatus 10 may be lifted away from the pulley 10 as shown in FIGS. 9*g* and 9*h*, respectively. Again, the lift couplings 22 may need to be rebalanced by rotating the cams 46 and sliding the couplings 22 to engage with appropriate ones of the notches 24 prior to lifting the apparatus 10.

Advantageously, there has been described a lifting apparatus that includes lift couplings that are lockable or retained in a first condition, and then slidable and repositionable in a second condition to allow balancing of load when the apparatus is connected to the pulley. In particular, cams of the lift couplings are arranged such that when being lifted with lifting force and angle serves to main the first condition, and only once the lifting load is removed and the cams are moved to a non-lifting angle—may the lift couplings be moved and repositionable. The lift couplings are not required to be removed during this process.

Further, the lifting apparatus incudes a telescopic arrangement to couple to and clamp onto the pulley for lifting. The first telescopic adjustment arrangement is provided to obtain the approximate fitment and a first stage of locking, and the second telescopic adjustment arrangement may be used for the finer adjustment, and final clamping and second stage of locking to the pulley which improves the grip of the apparatus and the pulley.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any known matter or any prior publication is not, and should not be taken to be, an acknowledgment or admission or suggestion that the known matter or prior art publication forms part of the common general knowledge in the field to which this specification relates.

While specific examples of the invention have been described, it will be understood that the invention extends to alternative combinations of the features disclosed or evident from the disclosure provided herein.

Many and various modifications will be apparent to those skilled in the art without departing from the scope of the invention disclosed or evident from the disclosure provided herein.

The invention claimed is:

1. A lifting apparatus for a pulley, the apparatus including:

a first beam section adapted to couple to the pulley in a fitted condition; and a second beam section connected to the first beam section in a spaced apart relationship extending parallel to the first beam section and defining a gap between the first beam section and the second beam section;

wherein the second beam section includes a lifting arrangement including a pair of lift couplings and a plurality of notches, the pair of lift couplings being moveable between a first condition in which each one of the pair of lift couplings are able to be moved between the plurality of notches, and a second condition in which each one of the pair of lift couplings is substantially retained in a respective one of the plurality of notches, wherein the second beam section includes at least one track arranged adjacent to the plurality of notches and extending in lengthwise direction relative to the second beam section, wherein the pair of lift couplings are slidable along the track in the first condition.

2. The lifting apparatus according to claim 1, wherein the pair of lift couplings are adapted to be rotatable between the first condition and the second condition.

3. The lifting apparatus according to claim 1, wherein each one of the lift couplings includes a first end adapted to couple with one of the plurality of notches and a second end adapted to couple with a lifting tether.

4. The lifting apparatus according to claim 3, wherein the first end includes a cam, the cam being arranged to substantially lock the lift couplings in the second condition during lifting by the lifting tether.

5. The lifting apparatus according to claim 4, wherein the cam is shaped to create an interference fit between the track and respective one of the plurality of notches in the second condition.

6. The lifting apparatus according to claim 5, wherein in the second condition, each of the pair of lift couplings are angled toward one another.

7. The lifting apparatus according to claim 6, wherein the cam is shaped to enable the lifting couplings to be unlocked by rotation of each one of the pair of lift couplings in a direction away from one another so as to be moveable in the first condition.

8. The lifting apparatus according to claim 7, wherein each one of the lift couplings includes a pin at its respective first and second ends.

9. The lifting apparatus according to claim 7, wherein each one of the lift couplings is elongate and independently moveable relative to the other of the lift couplings.

10. The lifting apparatus according to claim 1, wherein the first beam section is adjustable in length.

11. The lifting apparatus according to claim 10, wherein the length of the first beam section is fixable in the fitted condition.

12. The lifting apparatus according to claim 11, wherein the first beam section is telescopically adjustable.

13. The lifting apparatus according to claim 12, the first beam section includes a first telescopic adjustment arrangement and a second telescopic adjustment arrangement.

14. The lifting apparatus according to claim 13, wherein the first telescopic adjustment arrangement includes stepwise adjustment, and the second telescopic adjustment arrangement includes continuous adjustment.

15. The lifting apparatus according to claim 14, wherein the first telescopic adjustment arrangement includes a pin and an aperture arrangement, and the second telescopic adjustment arrangement includes a threaded member to apply a clamping force to the pulley in the fitted condition.

16. The lifting apparatus according to claim 1, wherein first and second ends of the first beam section include projections adapted to capture the pulley therebetween.

17. A method for lifting a pulley using a lifting apparatus, the method including the steps of:

a. coupling a first beam section of the lifting apparatus to the pulley;

b. sliding, in an unlocked condition, one or both of a pair of couplings along a track of a second beam section of the lifting apparatus and aligning the one or both of the pair of couplings with respective selected notches located adjacent the track;

C. rotating each of the pair of couplings to a locked condition, in which each of the pair of couplings becomes substantially locked with its respective selected one of the notches;

d. connecting a tether to each of the pair of couplings such that the lifting apparatus and coupled pulley are liftable.

18. The method according to claim 17, wherein rotating each of the pair of couplings to the locked condition includes rotating a cam associated with each of the pair of couplings to provide an interference fit between the track and respective one of the selected notches.

19. The method according to claim 17, wherein the coupling of the first beam section to the pulley includes telescopically adjusting the length of the first beam section.

20. A lifting apparatus for a pulley, the apparatus including:

a first beam section adapted to couple to the pulley in a fitted condition; and a second beam section connected to the first beam section in a spaced apart relationship extending parallel to the first beam section and defining a gap between the first beam section and the second beam section;

wherein the second beam section includes a lifting arrangement including a pair of lift couplings and a plurality of notches, the pair of lift couplings being moveable between a first condition in which each one of the pair of lift couplings are able to be moved along a track between the plurality of notches, and a second condition in which each one of the pair of lift couplings is substantially retained in a respective one of the plurality of notches, wherein each one of the lift couplings includes a first end adapted to couple with the respective one of the plurality of notches and a second end adapted to couple with a lifting tether, wherein the first end includes a cam, wherein the cam is shaped to create an interference fit between the track and respective one of the plurality of notches in the second condition to substantially lock the lift couplings in the second condition during lifting by the lifting tether.

* * * * *